United States Patent [19]

Ota et al.

[11] 4,392,161
[45] Jul. 5, 1983

[54] RECORDED TAPE, SPEED-CHANGE REPRODUCING SYSTEM

[75] Inventors: Yoshihiko Ota, Yokohama; Yositeru Kosaka, Kamakura, both of Japan

[73] Assignee: Victor Company of Japan, Ltd., Yokohama, Japan

[21] Appl. No.: 181,010

[22] Filed: Aug. 25, 1980

Related U.S. Application Data

[63] Continuation of Ser. No. 915,760, Jun. 15, 1978, abandoned.

[30] Foreign Application Priority Data

Jun. 16, 1977 [JP] Japan .................................. 52-71374

[51] Int. Cl.³ .......................................... H04N 5/785
[52] U.S. Cl. .......................................... 360/10.3; 360/8
[58] Field of Search .......................... 360/8–10, 360/33, 36, 26, 27, 21, 19, 9.1, 10.1, 10.2, 10.3; 358/4, 8; 179/15.55 T

[56] References Cited

U.S. PATENT DOCUMENTS 3,855,424 12/1974 Tharmayatnam ................. 2360/8
3,873,778 3/1975 Mutsuura .......................... 360/8
3,925,816 12/1975 Kihara ............................... 360/33

OTHER PUBLICATIONS

Downing, "The World of Helical Scan", British Kinematography Sound and Television, 11/70, vol. 52, No. 11, pp. 344–354.

Dage Television Co., Model DV-200 Advertising Brochure.

*Primary Examiner*—Raymond F. Cardillo, Jr.
*Attorney, Agent, or Firm*—Louis Bernat

[57] ABSTRACT

A recorded tape, speed-change reproducing system comprises a transport for transporting a tape at a speed which is different from that used for normal reproduction (and recording). The tape carries a video signal which was recorded, by a rotary video head, on parallel video tracks which are disposed obliquely relative to the longitudinal direction of tape travel. An audio signal is recorded by a stationary audio head with an audio track extending longitudinally along the length of the tape. The rotary video heads scan the video tracks on the tape to reproduce the recorded video signal when the tape speed changes. The stationary audio head also scans the audio track on the tape under speed-change situations. The pitch of the reproduced audio signal is corrected in such a manner that the pitch is returned to become substantially equal to the pitch of the reproduced audio signal, as if the tape was travelling at the recording speed.

2 Claims, 7 Drawing Figures

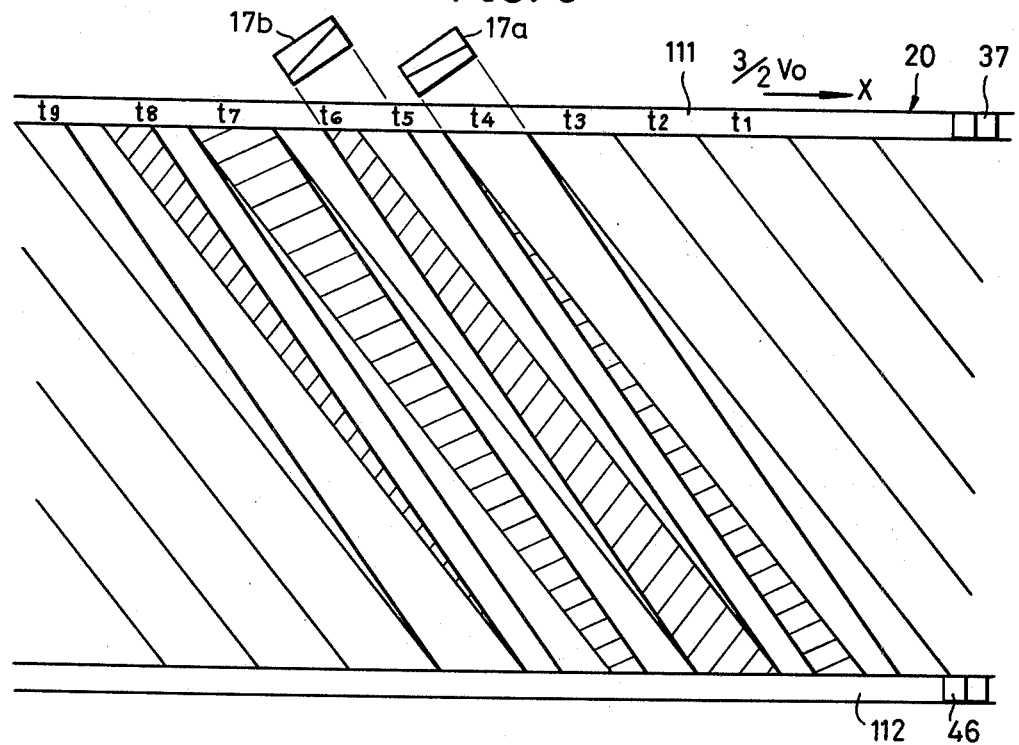
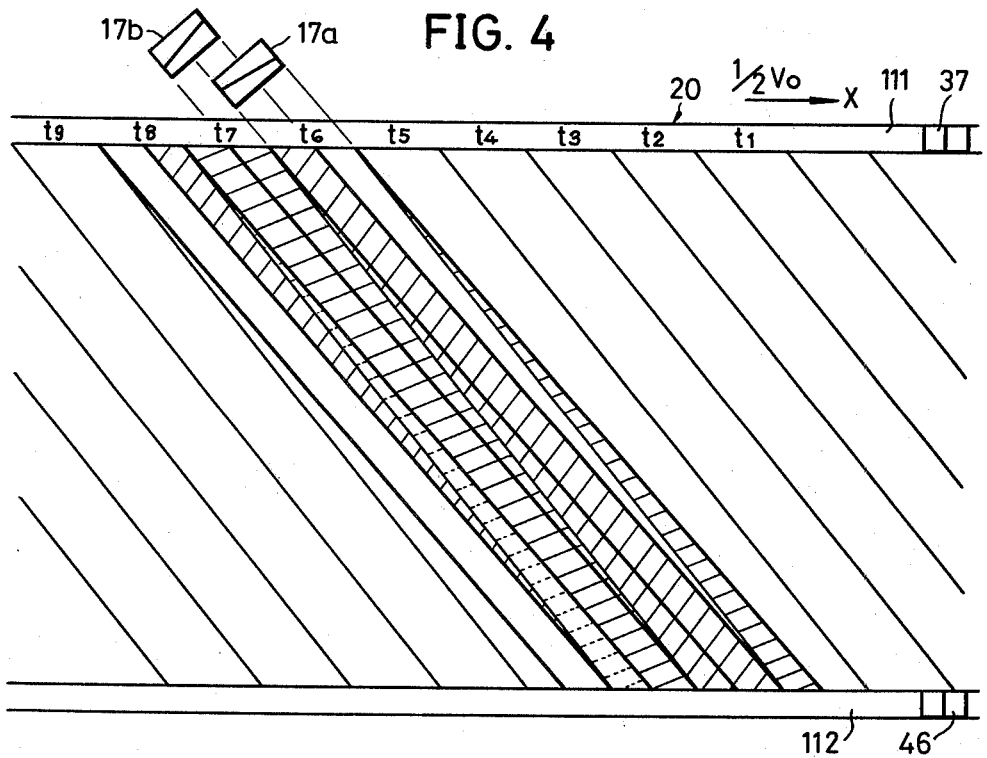

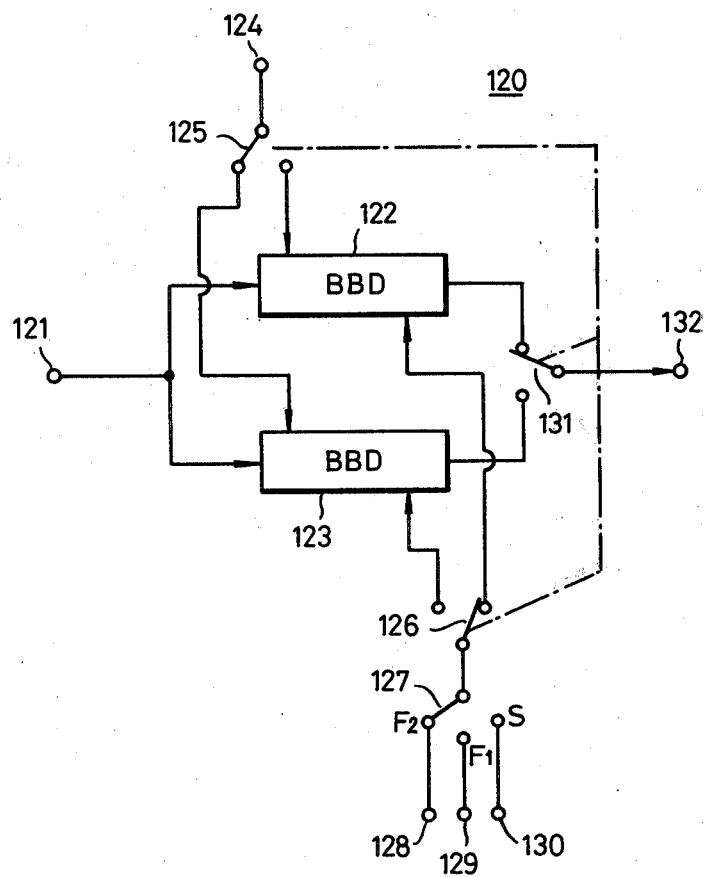

RECORDED TAPE, SPEED-CHANGE REPRODUCING SYSTEM

This is a continuation of application Ser. No. 915,760, filed June 15, 1978, now abandoned.

BACKGROUND OF THE INVENTION

The present invention relates generally to recorded tape, speed-change reproducing systems, and more particularly to a system in which a tape, on which a video signal and an audio signal have been recorded, is reproduced at a speed differing from that used during recording.

In the prior art, a video signal is recorded on a magnetic tape on parallel tracks formed obliquely to the longitudinal direction of the magnetic tape.

This tape may travel at a reproducing speed which is different from the speed that was used at the time of recording. Or, the reproduced tape may stop to cause a speed-change in reproduction, such as quick-motion reproduction, slow-motion reproduction, or still picture reproduction. In this system, the tape speed at the time of reproduction is different from that at the time of recording. The path traced by the rotary head for reproducing the video signal differs from the path (track) traced by the rotary head during recording.

On the one hand, in a conventional video signal recording and reproducing system, recording is ordinarily, carried out on a recording medium by forming a track thereon in a manner which leaves an unrecorded zone or band called a guard band between neighboring tracks in order to prevent the generation of beats caused by the reproduction of signals from neighboring tracks due to tracking deviation of the rotary head at the time of reproduction. When a tape recorded in this manner is played back by speedchange reproduction as described above, the rotary head traces over both the track and the unrecorded guard band. When the rotary head traces over the unrecorded band, the level or strength of the reproduced signal is remarkably lowered; or it could disappear. For this reason, a noise is generated in the reproduced picture. Furthermore, since unrecorded bands are provided between the tracks in the above-mentioned system, the efficiency of the tape utilization has been poor.

In addition, there has been a system wherein the angle of inclination of the tape relative to the rotary head rotating plane is varied in accordance with the tape speed so that the rotary heads will trace accurately over the track at the time of speed-change reproduction. However, this system has a complex mechanism for varying the inclination angle of the tape, which gives rise to a high cost. It is difficult to track accurately in actual practice.

On the other hand, a system has been proposed wherein tracks are formed on a tape without gaps or guard bands between neighboring tracks. A color video signal can be recorded and reproduced without causing a beat disturbance. This system is described in the U.S. patent application Ser. No. 731,935 entitled "Color video signal recording and/or reproducing system", filed Oct. 13, 1976, by Akira Hirota and assigned to Victor Company of Japan, Ltd., the same assignee of the present invention.

In this previous system, a pair of azimuth heads have gaps which are inclined, with a certain azimuth angle, in mutually opposite directions with respect to the direction which is perpendicular to the longitudinal direction of the track. Neighboring tracks are formed in contiguous contact side-by-side without a gap or guard band therebetween. Furthermore, the phase of the chrominance signal is shifted by 90 degrees for every horizontal scanning period. The direction of this phase shifting is reversed from one track to the neighboring track. In accordance with this system, the tape utilization efficiency is high since the tracks are in close contact with each other. Moreover, there is no beat disturbance.

Further, another system has been previously proposed which is particularly applicable to the above mentioned system. The above described difficulties has been overcome, as described in the U.S. patent application Ser. No. 891,409 entitled "Video signal speed-change reproducing system", filed Mar. 29, 1978, by Yoshihiko Ota and assigned to Victor Company of Japan, Ltd., the same assignee of the present invention. According to this system, the tape utilization efficiency is high. Any noise bar due to a lowering of the reproduced signal strength in the reproduced picture is always located at an inconspicuous position on the picture screen. Moreover a wide speed-change range can be used.

In the apparatus to which the above system is applied, the rotational speed of the rotary head is extremely high in comparison with the tape travel speed. Even if the tape travel speed changes according to the above described special speed-change reproduction modes, the scanning speed of the rotary heads relative to the tape speed undergoes change little change. The audio signal is recorded by a stationary head on a track for audio signals formed near the edge of the tape. The audio track extends in the longitudinal direction along the tape. Thereafter, it is reproduced by the stationary head. Accordingly, in the above described speed-change reproduction mode, when the tape travels at a speed which is different from that used at the time of recording, the track for the audio signal is traced by the stationary head at a relative speed which is different from that at the time of recording.

Therefore, in the speed-change reproduction mode, the audio signal is reproduced as a signal having frequency and pitch which is different from those used at the time of recording (or normal reproduction). As a result, in the speed-change reproduction mode, the frequency, pitch, tone quality and the like change greatly from those at the time of normal reproduction. It becomes extremely hard to hear the reproduced sound, or difficult to comprehend the reproduced sound information contents.

SUMMARY OF THE INVENTION

Accordingly, it is a general object of the present invention to provide a novel and useful recorded tape, speed-change reproducing system in which the above described difficulties have been overcome.

A specific object of the present invention is to provide a recorded tape, speed-change reproducing system in which the tape utilization efficiency is high. Another object is to reproduce the video signal in a manner such that any noise bar due to a lowering of the reproduced signal on the reproduced picture is always located at an inconspicuous position on the picture screen. Yet another object is to reproduce the audio signal at a pitch which is substantially equal to the pitch at the time of normal reproduction, despite the fact that the tape is travelling at a speed which is different from that used in the normal reproduction mode.

Further objects and features of the invention will be apparent from the following detailed description when read in conjunction with the accompanying drawings.

BRIEF DESCRIPTION OF THE DRAWINGS

In the drawings:

FIG. 3 is a diagram indicating the scanning track pattern at the time of 3/2-speed fast motion reproduction;

FIG. 4 is a diagram indicating the scanning track pattern at the time of half-speed slow motion reproduction;

FIG. 5 is a block diagram showing another embodiment of the audio signal correcting-processing circuit indicated in FIG. 1.

DETAILED DESCRIPTION

Figure 1:
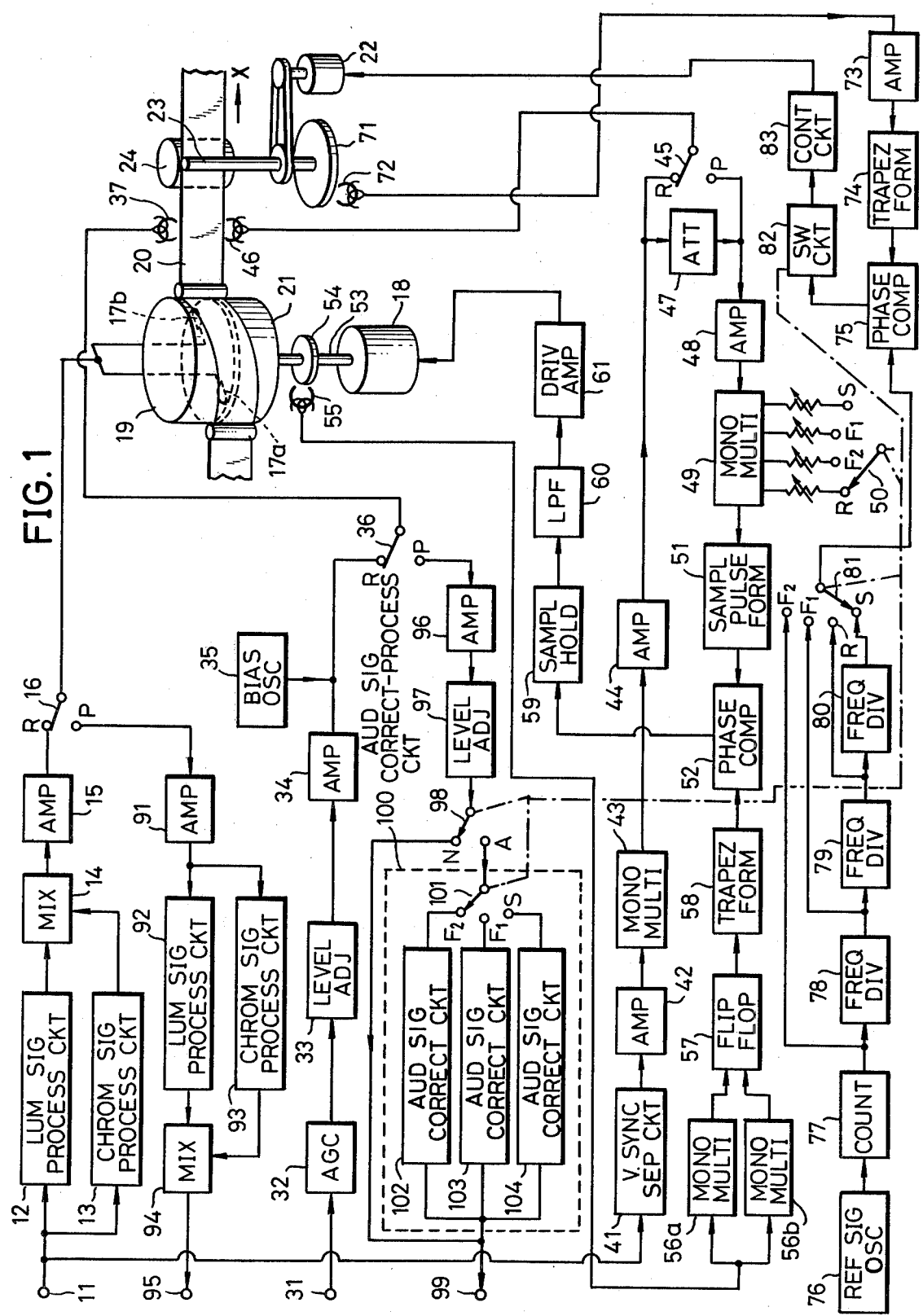
FIG. 1 is a block diagram of one embodiment of the recording and/or reproducing system which is capable of embodying a recorded tape, speed-change reproducing system according to the present invention.

Referring first to FIG. 1, a color video signal is applied to an input terminal 11 and is supplied to a luminance signal processing circuit 12 and to a chrominance signal processing circuit 13. In the luminance signal processing circuit 12, only the luminance signal is separated from the color video signal, and is frequency modulated. Moreover, the unrequired frequency component is removed therefrom. The resulting frequency-modulated luminance signal is then supplied to a mixer 14. In the chrominance signal processing circuit 13, only the carrier chrominance signal is separated, and is frequency converted to a band which is lower than the above described frequency-modulated luminance signal. Moreover, the unrequired frequency component is removed therefrom. The resulting carrier chrominance signal which is converted to a lower frequency band is supplied to a mixer 14 where it is mixed with the above described frequency-modulated luminance signal. In the chrominance signal processing circuit 13, the carrier chrominance signal is frequency converted as described above. This chrominance signal is processed in a manner such that its phase shifts by 90° during every successive horizontal scanning period. This phase shifting direction reverses every successive field. The organization and operation of the above described signal processing circuits 12 and 13 are described in detail in U.S. patent application Ser. No. 731,935.

An output signal of the mixer 14 is amplified by an amplifier 15 and is then supplied, by way of a switch 16 switched to a contact point a, to rotary video heads 17a and 17b. The video heads 17a and 17b have mutually opposite azimuths, as described hereinafter, and are mounted on diemetrically opposite sides of a rotary drum 19 which rotates at a speed of 30 rps. by a motor 18. A magnetic tape 20 is wrapped obliquely around the rotary drum 19 and a stationary drum 21. The tape is driven to travel in the arrow direction X by a capstan 23 driven by a motor 22 and a pinch roller 24. A video signal is recorded by the video heads 17a and 17b alternately along tracks on the tape 20, successively one field per track. The tracks are positioned contiguously to each other and obliquely relative to the longitudinal direction of the tape.

On the other hand, an audio signal is applied to an input terminal 31. This signal passes through an automatic gain control circuit (AGC) 32, and then its level is adjusted by a level adjuster 33. The signal thus level-adjusted is amplified by a recording amplifier 34. It is then supplied, together with an AC bias signal from a bias oscilator 35, through a switch 36 switched to a contact point R, to a stationary audio head 37, by which the signal is recorded on a track extending in the longitudinal direction of the tape along one edge thereof.

The color video signal introduced through the input terminal 11 is also supplied to a vertical synchronizing signal separation circuit 41, where a vertical synchronizing signal is separated. The 60 Hz vertical synchronizing signal thus separated is supplied through an amplifier 42 to a monostable multivibrator 43, which is thereupon triggered to produce a 30 Hz control signal. This output control signal is supplied, by way of a recording amplifier 44 and a switch 45 switched to the contact point R, to a control head 46, by which the signal is recorded on a track extending in the longitudinal direction of the tape along the opposite edge thereof.

The output signal of the recording amplifier 44 is also supplied to an attenuator 47. The signal which has passed through the attenuator 47 is supplied through an amplifier 48 to a monostable multivibrator 49. The switching and setting of the time constant of this monostable multivibrator 49 is carried out by the change-over of a switch 50. Resistors of different resistance values are connected between the monostable multivibrator 49 and the contacts of the switch 50. This monostable multivibrator 49 produces an output pulse signal which rises in response to a signal from the amplifier 48 and falls with a time constant selected by the switch 50. This switch 50 is connected to the contact point R at the time of recording and at the time of normal reproduction. The above mentioned output pulse signal is formed into a sampling pulse signal by a sampling pulse forming circuit 51 and is thereafter supplied to a phase comparator (sampling circuit) 52.

The above mentioned rotary drum 19 is coaxially mounted on a vertical rotating shaft 53, which is driven by the motor 18. The shaft 53 rotates together with the rotary drum 19. A pair of magnets of opposite polarity are mounted on a rotating disc 54 fixed coaxially on the rotating shaft 53. Together with rotation of the rotary drum 19, pulses of positive polarity and negative polarity are obtained alternately by a pickup head 55 and are supplied to trigger monostable multivibrators 56a and 56b. The outputs of the monostable multivibrators 56a and 56b are supplied to a flip-flop circuit 57. The resulting output of the flip-flop circuit 57 is supplied to a trapezoid wave forming circuit 58 and formed into a trapezoid wave, which is then supplied to the phase comparator 52.

In the phase comparator 52, the sampling pulses from the sampling pulse forming circuit 51 sample the inclined part of the trapezoid wave. The resulting output signal of the phase comparator 52 is held by a sampling-hold circuit 59 and is supplied through a low-pass filter 60 for removing high frequency components and for integrating the signal, and then through a driving amplifier 61 to control the rotation of motor 18. The rotational phase of the motor 18 is so controlled that the sampling position on the trapezoid wave in the phase comparator 52 will become a specific position, for example, the middle position of the inclined part of the trapezoid wave.

In this connection, instead of controlling the rotation of the motor 18 by means of the phase comparator 52, the rotational phase of the motor 18 may be controlled by causing the motor 18 to rotate at a specific constant speed and by controlling the electromagnetic braking of the rotation of the motor 18 responsive to the output of the phase comparator 52.

The rotation of the capstan 23 is detected by a pickup head 72 cooperative with the magnets mounted on the flywheel 71 secured to the capstan 23. This detected output is supplied, after passing through an amplifier 73, to a trapezoid wave forming circuit 74 and formed into a trapezoid wave, which is then supplied to a phase comparator 75. An output reference signal of a reference signal oscillator 76 is successively counted down (frequency-divided) by a counter 77, and the frequency dividers 78 and 79. Then, it is supplied, by way of a switch 81 connected to the contact point R, to a phase comparator 75. The other contact points S, F1, and F2 of the switch 81 are respectively connected to the output of the frequency dividers 80 and 78, and the counter 77.

The output error voltage of the phase comparator 75 is supplied to a switching circuit 82, where it is added to a DC voltage corresponding to the tape speeds, conforming to the operational modes. The output voltage of the switching circuit 82 is supplied to a rotation control circuit 83 thereby to control rotation of the capstan motor 22. This known control circuit 83 is adapted to control the rotation of the DC capstan motor 22 and to hold it constant by using a counter electromotive force of the motor 22.

Next, a description is given of the operation at the time of reproducing the tape on which the signals have been recorded as described above. First, at the time of normal reproduction, the switches 16, 36, and 45 are respectively switched to a contact point P, and the switches 50 and 81 are respectively switched to the contact points R. The rotational phase and rotational speed of the capstan motor 22 are controlled in accordance with the output of the phase comparator 75 where the output phase of the trapezoid wave of the trapezoid wave forming circuit 74 and the output phase of the frequency divider 79 are compared. This comparison and control is similar to the comparison and control during the preceding recording mode. Thus, the tape is driven by the capstan 23 at a speed which is equal to that at the time of the recording mode. The phase comparator 52 is supplied with a detection signal from the pickup head 55 and with a reproduced control signal from the control head 46, thereby generating a phase comparison error output. In response to this resulting output, the rotational phase of the motor 18 is controlled.

The video signals are reproduced alternatively by the rotary video heads 17a and 17b and are supplied, through an amplifier 91, to a luminance signal processing circuit 92 and to a chrominance signal processing circuit 93. In the luminance signal processing circuit 92, the frequency-modulated luminance signal is separated from the reproduced signal, is amplitude limited, and is then frequency demodulated. Moreover, unrequired components are removed therefrom. In the chrominance signal processing circuit 93, the carrier chrominance signal is converted to a lower frequency band and separated from the reproduced signal. It is then frequency-converted to the original band. A time-axis fluctuation is also removed. Moreover, when the above described frequency conversion is carried out, the carrier chrominance signal is also successively shifted by 90° for every horizontal scanning period, with shifting in a direction opposite to the shifting which occurred at the time of recording. The organization and operation of the signal processing circuits 92 and 93 are also described in the above mentioned U.S. patent application Ser. No. 731,935.

The luminance signal and the carrier chrominance signal from the signal processing circuits 92 and 93 are mixed in the mixer 94, and the resulting reproduced color video signal is led out through an output terminal 95.

The audio signal reproduced by the stationary audio head 37 is supplied, by way of an amplifier 96 and a level adjuster 97, to a switch 98. The switch 98 is switched to a contact point N at the time of normal reproduction, and to a contact point A at the time of speed-change reproduction such as slow-motion reproduction and fast-motion reproduction. At the time of normal reproduction, the output signal of the level adjuster 97 passes through the switch 98 and is directly led out through an output terminal 99.

Next to be described in the operation at the time of speed-change reproduction mode.

At the time of speed-change reproduction, if the tape speed (inclusive of zero) is different from the tape speed at the time of normal reproduction, the tape speed is selected to satisfy the following equation:

$$V = Vo\left(\frac{n \pm 2}{n}\right)$$

where:
V is the tape speed for speed-change reproduction mode;
Vo is the tape speed for normal reproduction mode (and recording); and
n is a positive integer.

The rotating speed of the heads 17a and 17b is always constant, (i.e., 30 rps. in all reproduction modes). Since the tape speed satisfies this equation, the minimum position (the distance from the tape edge) at which the reproduced signal level becomes minimum due to the deviation of the heads 17a and 17b from their tracks, is always constant. Consequently, the position of the minimum signal on the reproduced picture screen is always constant, as described hereinafter.

Figure 2A:
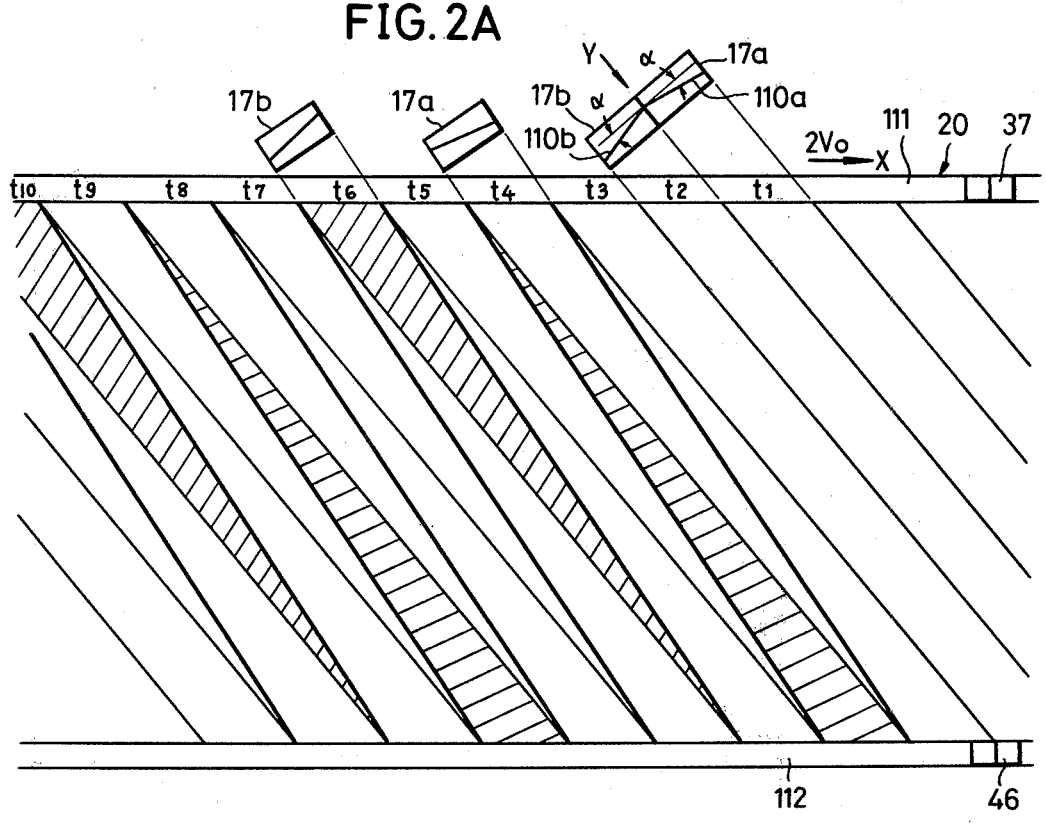
FIGS. 2A and 2B are respectively a diagram indicating the scanning track pattern at the time of double-speed, fast (quick) motion reproduction and a graph indicating the variation with time of the level of the reproduced signal.
Figure 2B:
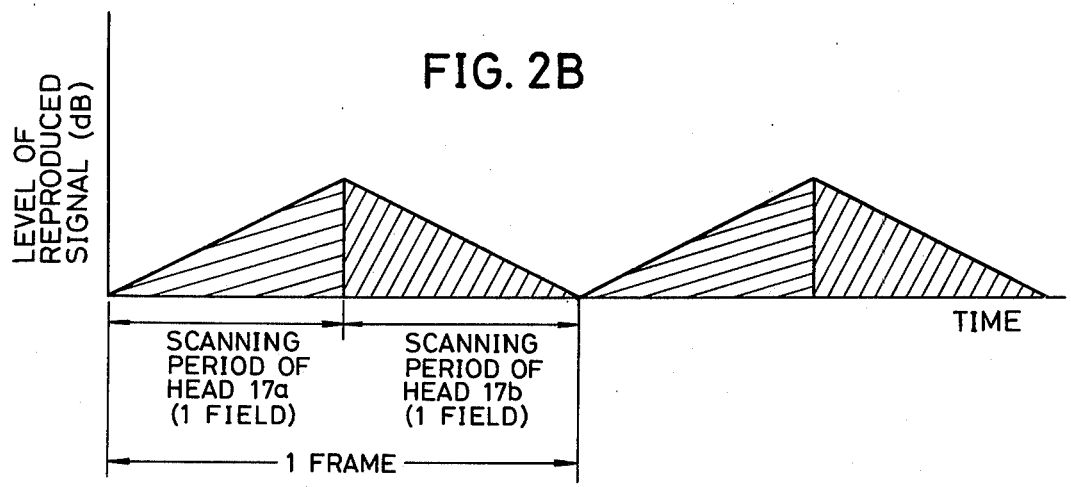

An example is next described wherein reproduction is under the condition of n=2, with a positive symbol within the parenthesis in the equation set forth hereinbefore, where V=2Vo, that is, a double-speed fast-motion reproduction, FIGS. 2A and 2B.

As indicated in FIG. 2A, the video heads 17a and 17b have respective azimuth gaps 110a and 110b inclined by an azimuth angle α, in mutually opposite directions relative to the direction which is perpendicular to the scanning direction. The tracks recorded and formed on the tape 20 by the video head 17a rotating in the arrow direction Y are designated by the characters $t_1$, $t_3$, $t_5$, . . . (wherein the subscripts of t are odd numbers). The tracks recorded and formed by the video head 13b are designated by the characters $t_2$, $t_4$, $t_6$, . . . (wherein the subscripts of t are even numbers). In this case, the tracks $t_1$, $t_2$, $t_3$, . . . are in contiguous contact without gaps therebetween, whereby the tape utilization efficiency is high. Each track is recorded with a part of a video signal corresponding to substantially one field. A vertical synchronizing signal is positioned near an end of the track. An audio signal and a control signal are recorded respectively at the upper and lower lateral edges of the tape 20 along the tracks 111 and 112 in the longitudinal direction of the tape.

At the time of double-speed fast-motion reproduction, the switches 81 and 50 are respectively switched to a contact point F2. The phase comparator 75 is thereby supplied with a signal having a frequency which is twice that of the reference signal for normal reproduction. The DC voltage level in the switching circuit 82 is also changed over, interlocked with the switches 81 and 50, to a level which is substantially twice that for normal reproduction. The tape 20 travels at the speed of 2Vo, which is twice that for normal reproduction. When the switch 50 is changed over, the monostable multivibrator 49 is set at a time constant for double-speed fast motion reproduction. As in the preceding example, the monostable multivibrator 49 operates once responsive to each two control signals reproduced, with double frequency, through the control head 46, and its time constant is so set that the head 17a starts reverse tracking scanning.

The head 17a starts scanning from the track $t_4$, for example, and ends its scanning at the track $t_5$. The head 17b starts scanning from the track $t_6$ and ends its scanning at the track $t_7$. Thereafter, the heads 17a and 17b scan other tracks in a similar manner. In this case, the head 17a carries out reverse tracking with respect to the track $t_4$ and normal tracking with respect to the track $t_5$, while the head 17b carries out normal tracking with respect to the track $t_6$ and reverse tracking with respect to the track $t_7$. Therefore, the heads 17a and 17b reproduce the tracks $t_5$, $t_6$, $t_9$, $t_{10}$. . . as indicated by hatching in FIG. 2A. Two fields are reproduced for each four recorded fields. Thus, double-speed fast-motion reproduction is carried out at a speed twice the speed of normal reproduction.

As the head 17a starts to scan from the starting end of the track $t_4$ and continues to scan, the scanned area of the track $t_5$ increases. Consequently, the level of the reproduced signal also increases, becoming a maximum at the lower end of the track $t_5$. On the other hand, as the head 17b starts to scan from the starting end of the track $t_6$, the level of the reproduced signal is at its maximum value, and the scanned area of the track $t_6$ decreases as the scanning proceeds. Accordingly, the reproduced signal level also decreases and becomes a minimum at the lower end of the track $t_6$.

Accordingly, the levels of the signals reproduced by the heads 17a and 17b become as indicated in FIG. 2B. The minimum point of the reproduced signal level occurs every two fields, that is, once during every one frame. Moreover, the accompanying noise bar is substantially within the vertical blanking period and is not conspicuous in the reproduced picture.

Next to be described is the head scanning loci at the time of reproduction under the condition of n=4, with a positive symbol within the parenthesis in the equation, whereby $V=(3/2)Vo$, that is, 3/2-speed fast motion reproduction, is as indicated in FIG. 3. Moreover, if, in the equation set forth hereinbefore, n=4 and the symbol within the parenthesis is negative, V becomes $(\frac{1}{2})Vo$, whereby ½-speed slow-motion reproduction is carried out. FIG. 4 shows the head scanning loci at the time of this reproduction. The switches 50 and 81 are respectively connected to the contact point F1 at the time of 3/2-speed fast-motion reproduction, and to the contact point S at the time of ½-speed slow-motion reproduction. Here, the operation at these modes will be easily understood in view of the above described operation for double-speed mode, and the description thereof is therefore omitted. The track tracing condition by the rotary video heads 17a and 17b, and the states of the reproduced signal and the like, at the time of the above described speed-change reproduction mode, are described in detail in our aforementioned U.S. patent application Ser. No. 891,409.

On the other hand, in the audio signal reproducing system, at the time of the above described speed-change reproduction mode, the switch 98 is switched to a contact point A. A switch 101 is changed over to contact points F2, F1, and S. The changing over operation of the switches 50 and 101 is interlocked with the operation of switches 50 and 80.

At the time of the double-speed fast-motion reproduction mode, the pitch of the reproduced audio signal is to be compressed in terms of the time axis. This compressed audio signal is supplied, by way of the switch 101 connected to the contact point F2, to a double audio signal correction circuit 102 in an audio signal correcting-processing circuit 100. In the correction circuit 102, the reproduced audio signal is expanded in terms of a time-axis, thereby to be approximately the same as the audio signal that was recorded, and is then led out through the output terminal 99.

Similarly, at the time of 3/2-speed fast-motion reproduction, the reproduced audio signal is supplied, by way of the switch 101 switched to the contact point F1, to a 3/2 times audio signal correction circuit 103, where it is subjected to an expansion of the time axis.

At the time of ½-speed slow-motion reproduction, the reproduced audio signal pitch changes to become expanded in terms of a time axis. This expanded audio signal is supplied, by way of the switch 100 connected to the contact point S, to a ½ times audio signal correction circuit 104. In this correction circuit 104, the reproduced audio signal is compressed in terms of a time axis, to become an audio signal approximately the same as the recording audio signal, and is then led out through the output terminal 99.

The above described correction circuits 102, 103, and 104, may be adapted from an analog shift-register which is so arranged that an analog signal is written into a memory element, responsive to a clock signal of a constant frequency, and is read out responsive to a clock signal of ½ times, ⅔ times, or two times the original clock frequency. A digital memory subjects the audio signal to an analog-digital conversion and is thereafter memorized as a digital signal. The signal thus recorded is read out at different speeds and is then subjected to digital-analog conversion.

An audio signal correcting and processing circuit 120, which is another embodiment of the audio signal correcting and processing circuit 100, is indicated in FIG. 5. The reproduced audio signal is fed by way of the switch 98 connected to the contact point A, to an input terminal 121, and is then supplied to bucket brigade devices (BBD) 122 and 123 of 512 bits, for instance. Either one of the BBDs 122 and 123, writes in the reproduced input audio signal responsive to a clock pulse for writing-in which is introduced through an input terminal 124 and a switch 125. The other BBD reads out of the memorized reproduced audio signal under the control of a clock pulse for reading-out which is introduced through a switch 126. A switch 127 connected to the switch 126 is changed over among the contact points F2, F1, and S respectively connected to terminals 128, 129, and 130, in accordance with the reproduction modes.

The audio signal which is written in to and is then read out from the BBDs 122 and 123 is obtained, through a switch 131, from an output terminal 132.

Here, the switches 125, 126, and 131 are of interlocking arrangement. When one BBD among the BBDs 122 and 123 is being controlled by the clock pulse for reading-out the other BBD is being controlled by the clock pulse for writing-in. The BBD carrying out the writing-in operation receives the full input reproduced audio signal up to 512 bits. The switches 125, 126, and 131 are changed over in such a manner that the clock pulse for reading-out is applied to the BBD which has been carrying out the writing-in operation. The clock pulse for writing-in to the BBD is carrying out a reading-out operation. In this manner, the BBDs 122 and 123 alternately carry out the reading-out and writing-in operations.

The clocks for reading-out are connected to the terminals 128, 129, and 130 respectively. Their specific frequencies are ½, ⅔, and 2 times the frequency of the clock pulse for writing-in, and are selectively used by changing over of the switch 127, in conformance with the reproducing modes. For instance, at the time of double-speed fast-motion reproduction, the switch 127 is switched to the terminal F2. The clock pulse for reading-out is half the frequency of the clock pulse for writing-in. This reading-out clock pulse is introduced through the terminal 128, by way of the switch 127, to the BBD 122 or 123, thereby causing them to read out. Accordingly, the reproduced input audio signal, is compressed by half in term of its time axis, and is supplied to and written in the BBDs 122 and 123. There it is expanded two times in terms of time axis and is read out alternately from the BBDs 122 and 123 as the audio signal having a pitch approximately the same as that of the audio signal at the time of normal reproduction (or recording). The audio signal from the BBDs 122 and 123 is continuously led out through an output terminal 132.

Moreover, at the time of 3/2-speed fast-motion reproduction and ½-speed slow-motion reproduction, the audio signal in which the time-axis is substantially restored is led out through the output terminal 132 in a similar manner.

At, at the time of ½-speed slow-motion reproduction, the BBDs 122 and 123 have a relatively small memory capacity of 512 bits, and read out at a speed two times that for writing in. Therefore, during the last half of the reading-out period of time, the reading-out is carried out for a part of the BBD where no audio signal has been recorded, whereby a no-signal state takes place. This difficulty may be overcome by using an analog shift-register such as a BBD of fully large memory capacity, as the BBDs 122 and 123. Moreover, an alternative organization may be adopted such as that, during a no-signal period, the changeover takes place to the other BBD output, or the read-out signal of the BBD is fed back thereby to be introduced to said BBD.

Figure 6:
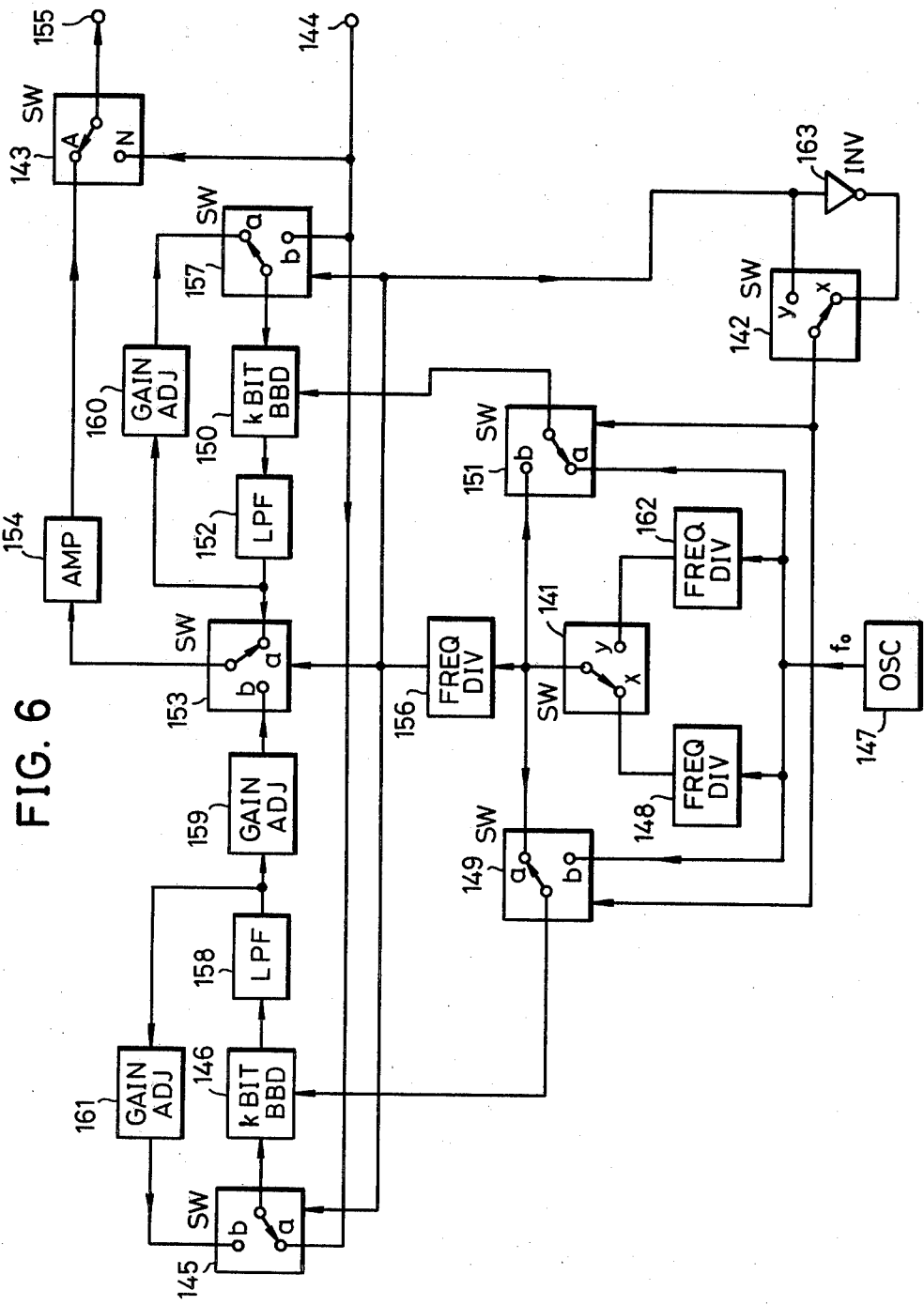
FIG. 6 is a block diagram showing still another embodiment of the audio signal correcting-processing circuit.

Still another embodiment of the audio signal correcting and processing circuit is indicated in FIG. 6. Switches 141 and 142 are switched between the contact points x and y, as indicated in a table described hereinafter, in conformance with the speed-change reproduction mode. In the present embodiment, the following reproduction can be carried out; ½-speed slow-motion, ⅔-speed slow-motion, double-speed fast-motion, and 3/2-speed fast-motion reproduction.

| switch | reproduction mode | | | |
| --- | --- | --- | --- | --- |
| | ½-speed slow-motion | ⅔-speed slow-motion | double-speed fast-motion | 3/2-speed fast-motion |
| 141 | x | y | x | y |
| 142 | x | x | y | y |
| tape speed ratio | ½ | ⅔ | 2/1 | 3/2 |

A switch 143 is adapted to be switched to the contact point N, at the time of normal reproduction, and to the contact point A, at the time of speed-change reproduction, in response to the operation of the apparatus.

For ½-speed slow-motion reproduction, for example, the reproduced audio signal (being expanded, in terms of time axis, two times that for normal reproduction) is introduced through an input terminal 144 and is supplied, by way of a switch 145 connected to a contact point a, to a BBD 146 of k bits where it is slowly written in at a clock frequency fo/2. The output clockpulse of frequency fo is supplied from an oscillator 147 to a frequency divider 148 where it is divided to half frequency to become the clock frequency fo/2, and is then supplied, by way of the switches 141 and 149 switches to the contact points x and a, respectively to the BBD 146.

On the one hand, BBD 150 which has been fully written in k bits is read out at a speed which is two times the writing-in speed, responsive to a clock pulse of a frequency fo which is supplied from the oscillator 147 through a switch 151. The resulting output of the BBD 150 passes successively through a low-pass filter 152 for removing the clock output, a switch 153 connected to the contact point a, an amplifier 154, and the switch 143, and is then led out through an output terminal 155. Therefore, the output of the BBD 150 becomes the audio signal in which the pitch is substantially restored to that used at the time of normal reproduction.

A frequency divider 156 is provided for detecting whether the writing-in operation of the BBDs 146 or 150 is completed or not. This frequency divider 156 divides the input signal thereto to 1/k times frequency, and generates an output whereupon the clock pulses to the BBD (146 in the embodiment in FIG. 6) carrying out write-in reaches the k pulse and thereby causes the switches 145, 153, and 157 to change over at the same time. Thereupon, the operation of the BBDs 146 and 150 are changed over. That is, the BBD 146 reads out the audio signal in which the pitch is substantially restored. The resulting audio signal passes successively through a low-pass filter 158 for removing the clock component, a gain adjuster 159 for adjusting the output of the BBD 146 to be equal to the output of the BBD 150, the switch 153, the amplifier 154, and the switch 143, and is then led out through the output terminal 155. Thereafter, the above described operation is repeated.

The switches 145, 153, and 157 do not change over until the BBD 146 or 150 completes its writing-in operation. Then the BBD 146 writes in up to a half of the memory capacity, and the memory of the BBD 150 is read out until it is vacant. Thus, during the period of time when the signals are written to the following half of the memory capacity of the BBD 146, there continues no output from the BBD 150. For preventing this absence of output, the output of the BBD 150 is fed back to its input by way of the low-pass filter 152, the gain adjuster 160, and the switch 157. According to this feedback operation, the BBD 150 reads out the memory contents of the last one bit. The information which is the same as the preceding information is again written in the BBD 150, and is then read out one more time. Thus, the output of the BBD 150 never becomes zero. Specifically, the BBD 150 outputs the same information two times in repetition.

For the same purpose as the above, the output signal of the BBD 146 is fed back to an input thereof by way of the low-pass filter 158, a gain adjustor 161, and the switch 145.

The gain adjusters 160 and 161 are provided so as to nullify the level difference between the audio signal fed back and the audio signal which has not been fed back.

In the case where the switch 141 is switched to the contact point y, the output pulse of a ⅔ frequency divider 162 for dividing the output frequency of the oscillator 147 is applied as a read-out clock pulse to the BBD 146 or 150, which thereby produces the same information one and a half times.

When the switch 142 is switched to the contact point y, the switching relationship between a group of switches 145, 153, and 157, and another group of switches 149 and 151 is inverted, while the interlocking relationship between the above switches does not change. That is, when the switches 145, 153, and 157 are respectively being switched to the contact point a, the switches 149 and 151 are respectively being switched to the contact point b. This contact connecting causes the clock for writing-in to become faster than the clock for reading-out. The pitch of the audio signal from the output terminal 155 is slower than that of the audio signal introduced to the input terminal 144. Therefore, at the time of fast-motion reproduction, the switch 142 is switched to the contact point y. In this case, the feedback circuit from the output to the input of the BBD 146 and 150 is not used.

For instance, at the time of double-speed fast-motion reproduction, the switch 141 is switched to the contact point x and the switch 142 to the contact point y, as indicated in the above listed table. Accordingly, during the time when the BBD reads out its whole memory contents, the BBD for writing-in operates to rewrite the memory contents two times. Here, the first written memory contents of the latter BBD is read out wastefully, because this BBD is not connected to the switch 153, and the second written memory contents of this BBD is read out and led out through the switch 153 now connected to this BBD, and thereby used as an output.

An inverter 163 reverses the connection relationship between a group of switches 145, 153, and 157 and another group of switches 149 and 151, at the time of slow-motion reproduction and fast-motion reproduction.

Further, this invention is not limited to these embodiments. Variations and modifications may be made without departing from the scope of the invention.

What is claimed is:

1. A recorded tape, speed-change reproducing system comprising:

tape speed-change transport means for transporting a tape at a speed V which is represented by the equation $$V = Vo\left(\frac{n+2}{n}\right),$$

wherein Vo is the tape speed for normal reproduction (and recording); and n is a positive integer, said tape having a video signal recorded thereon, said tape being transported past a plurality of rotary video heads having gaps of mutually different azimuth angles, said signal being recorded in parallel video tracks disposed obliquely relative to the longitudinal tape direction, and an audio signal recorded by a stationary audio head with an audio track extending in the longitudinal tape direction;

means for causing a plurality of rotary video heads having gaps of said mutually different azimuth angles, to scan said video tracks recorded on said tape when said tape is travelling at any of many different speeds, in order to reproduce said recorded video signal;

means for causing said stationary audio head to scan said audio track on said tape when said tape is travelling at any of many different speeds, in order to reproduce said recorded audio signal;

means for correcting and processing a pitch of said reproduced audio signal so that said pitch becomes substantially equal to the pitch which was originally recorded when said tape was travelling at a normal speed, said correcting and processing means comprising:

first and second electric charge transferring element means, the number of stages in each of the first and second electric charge transferring element means being k;

pulse oscillator means for generating first cyclically recurring pulses having a repetitive frequency fo;

first frequency dividing means for receiving said first recurring pulses and for delivering second recurring pulses having a repetitive frequency fo.n'/(n'+2) wherein n' is a positive integer;

second frequency dividing means for dividing the frequency of said second recurring pulses in a ratio of 1/k;

first switching means responsive to the output of said second frequency dividing means for supplying said reproduced audio signal to a selected one of said electric charge transferring element means when said tape is travelling at a speed which is different from that used for recording and to shut off the supply of said reproduced audio signal to the other non-selected electric charge transferring element means;

second switching means responsive to the output of said second frequency dividing means for delivering an audio signal read out of said other non-selected electric charge transferring element means, as an output signal of the correcting and processing means;

third switching means responsive to the output of said second frequency dividing means for supplying said first and second recurring pulses, as clock pulses, to said other non-selected and selected electric charge transferring element means, respectively, at the time of slow-motion reproduction, and to said selected and other non-selected electric charge transferring element means, respectively, at the time of fast-motion reproduction;

said first, second and third switching means for cooperatively causing said first and second electric charge transferring element means to alternately repeat write-in and read-out in response to the output of said second frequency dividing means; and feedback means responsive to slow-motion reproduction for feeding-back an output of the electric charge transferring element means which is then reading-out to an input of said element means.

2. A recorded tape, speed-change reproducing system as claimed in claim 1 in which said first frequency dividing means comprises first and second frequency dividers for respectively receiving said first recurring pulses and producing recurring pulses having repetitive frequencies of fo/2 and 2fo/3, respectively, and fourth switching means for selectively supplying, as said second recurring pulses, either recurring pulses produced by said first or second frequency divider to said second frequency dividing means and said third switching means.

* * * * *